(12) United States Patent
Steenackers (10) Patent No.: US 7,631,855 B2
(45) Date of Patent: Dec. 15, 2009

(54) VIBRATION ISOLATOR

(75) Inventor: Pieter Delfina Steenackers, Heverlee (BE)

(73) Assignee: Scambia Industrial Developments AG, Schaan (LI)

( * ) Notice: Subject to any disclaimer, the term of this patent is extended or adjusted under 35 U.S.C. 154(b) by 483 days.

(21) Appl. No.: 11/183,500

(22) Filed: Jul. 18, 2005

(65) Prior Publication Data

US 2006/0017206 A1    Jan. 26, 2006

(30) Foreign Application Priority Data

Jul. 20, 2004    (CH)    .................................... 1221/04

(51) Int. Cl.
*F16F 1/36* (2006.01)
*F16M 13/00* (2006.01)

(52) U.S. Cl. .................... 267/148; 267/136; 267/140.5; 248/638

(58) Field of Classification Search ................. 267/136, 267/147, 148, 154, 140.5; 248/560, 638
See application file for complete search history.

(56) References Cited

U.S. PATENT DOCUMENTS

| | | | |
|---|---|---|---|
| 2,142,497 A * | 1/1939 | Clendenin | .................... 464/58 |
| 2,267,431 A | 12/1941 | Steensen | |
| 3,165,945 A | 1/1965 | Magrum | |
| 3,241,396 A | 3/1966 | Magrum | |
| 3,360,225 A * | 12/1967 | Camossi | ..................... 248/638 |
| 3,746,127 A | 7/1973 | Leventhal | |
| 5,438,828 A * | 8/1995 | Fukae | ......................... 60/302 |
| 5,690,322 A | 11/1997 | Hay | |
| 2004/0037447 A1* | 2/2004 | Kam | ......................... 381/431 |
| 2008/0276772 A1* | 11/2008 | Ozawa | ....................... 82/117 |

FOREIGN PATENT DOCUMENTS

| | | |
|---|---|---|
| DE | 199 47 794 A1 | 7/2000 |
| EP | 1 138 974 A2 | 10/2001 |
| FR | 2731044 A1 * | 8/1996 |
| GB | 1043758 | 9/1966 |
| GB | 1043 758 A | 9/1996 |
| JP | 61228112 A * | 10/1986 |
| JP | 2000/297638 A | 10/2000 |
| JP | 2001/280389 A | 10/2001 |

* cited by examiner

*Primary Examiner*—Melody M Burch
(74) *Attorney, Agent, or Firm*—Husch Blackwell Sanders Welsh & Katz (57) ABSTRACT

A method of using a vibration isolator comprising a first mounting plate and a second mounting plate, and at least one wire cable piece which is connected both to the first mounting plate and to the second mounting plate. The at least one wire cable piece is connected to the two mounting plates in such a way that it extends rectilinearly between the two mounting plates and has a high rigidity in the axial direction as a result of which the resonant frequency is pushed out of the main range of frequency generated by an engine block and further having a low rigidity in the direction of a plane perpendicularly with respect to the axial direction.

7 Claims, 7 Drawing Sheets

VIBRATION ISOLATOR

FIELD OF THE INVENTION

The invention relates to a vibration isolator and to a method of using a vibration isolator.

BACKGROUND

Vibration isolators are used, for example, in motor vehicles. An exhaust manifold is fastened to the upper end of the engine of a motor vehicle, which exhaust manifold comprises a plurality of manifold pipes (in accordance with the number of cylinders) which are typically flanged to the engine block substantially horizontally and then extend in the engine compartment in the downward direction in a bent away manner. The individual manifold pipes are brought together at the lower end of the exhaust manifold. Depending on the type of design, an exhaust gas catalytic converter can be provided so as to adjoin the exhaust manifold directly, which exhaust gas catalytic converter is connected fixedly to the exhaust manifold, for example by a flanged connection. The exhaust system (muffler, pipe) then adjoins the exhaust manifold or the exhaust gas catalytic converter, in which exhaust system the exhaust pipe initially extends bent into the horizontal direction again and is then guided along the underbody of the vehicle.

During operation of a motor vehicle, very considerable vibrations are sometimes produced in the engine. As far as possible, these vibrations are not to be transmitted to the exhaust system, or to as small an extent as possible, for which reason vibration isolators have already been proposed in the literature.

A vibration isolator of this type is described, for example, in JP-A-2000/297638. In this document, an exhaust gas catalytic converter is flanged on at the lower end of the exhaust manifold. An L-shaped plate is fastened by its limb to the engine block, while the exhaust gas catalytic converter is fastened to the protruding foot of the L-shaped plate with the aid of a threaded nut connection. As there are still very high temperatures in this region, the exhaust manifold and optionally the housing of the exhaust gas catalytic converter expand in the downward direction, after a cold start, until the operating temperature is reached. This thermal expansion downward is made possible by a sliding bush which is arranged around the screw and is guided through the foot of the L-shaped plate.

Other types of vibration isolators operate with two mounting plates, of which the first mounting plate is fastened, for example, to the engine block and the second mounting plate is fastened, for example, to the exhaust manifold or to the exhaust gas catalytic converter. The mounting plates are connected to one another with the aid of wire cable pieces. The wire cable pieces extend in the manner of a loop between the mounting plates, that is to say they emerge from the lateral faces of the first mounting plate, are guided in the manner of a loop to the second mounting plate and enter a lateral face of the second mounting plate which stands perpendicularly with respect to the lateral face of the first mounting plate, from which the wire cable pieces emerge. The ends of the wire cable pieces are connected to the respective mounting plate. Vibration isolators of this type are known, for example, from JP-A-2001/290389 or from EP-A-1 138 974.

Suspension means for components of exhaust systems are known from U.S. Pat. No. 3,746,127 and U.S. Pat. No. 2,267,431. In particular, these suspension means also comprise wire cable pieces, the ends of which can be pressed in each case into a sleeve which is then connected to a mounting plate. However, the wire cable pieces have to have a not inconsiderable flexibility in the axial direction, as they have to be capable of absorbing vibrations of the exhaust system, which vibrations occur during driving operation, for example when driving over a ridge in the ground. A very high rigidity of the wire cable piece in the axial direction is therefore undesirable.

A vibration absorber or shock absorber is known from U.S. Pat. No. 5,690,322, without specification of a particular intended use. Although the vibration or shock absorber described in this document likewise comprises a wire cable piece, the ends of which can be pressed into a sleeve, the wire cable piece has a bulge, in order to have sufficient flexibility in the axial direction, in order for it to be possible to be pressed together and pulled apart in the event of an appropriate vibration in the axial direction.

SUMMARY

Suspension means for exhaust systems having wire cable pieces thus always have to have a not inconsiderable flexibility in the axial direction and are therefore not suitable for use between the engine block of a motor vehicle and the exhaust manifold or exhaust gas catalytic converter. Secondly, it is true that the abovedescribed solutions which have been used previously as a vibration isolator between the engine block and the exhaust manifold or the exhaust gas catalytic converter and use wire cable pieces are all comparatively complicated both in structural terms and with regard to manufacture. It is therefore an object of the invention to propose a vibration isolator which is comparatively simple in structural terms, is relatively uncomplicated with regard to manufacture, and can be used between the engine block of a motor vehicle and the exhaust manifold or the exhaust gas catalytic converter; said vibration isolator therefore firstly has high rigidity in the main vibration direction of the engine block and the exhaust manifold relative to one another, but secondly permits thermal expansions of the exhaust manifold and is simple to install. This object is achieved by the vibration isolator according to the invention. A further aspect of the invention relates to a method of using a vibration isolator for fastening to the engine block of a motor vehicle and to its exhaust manifold or to an exhaust gas catalytic converter which is connected fixedly to the exhaust manifold.

In particular, the vibration isolator according to the invention is distinguished by the fact that the wire cable piece is connected to the two mounting plates in such a way that it extends rectilinearly between the two mounting plates. A vibration isolator of this type is both comparatively simple in structural terms and relatively uncomplicated with regard to manufacture, and it permits thermal expansions of the exhaust manifold. The functioning of the vibration isolator can be envisaged in such a way that the resonant frequency of the isolator in the direction of the rectilinear wire cable piece is so high that it lies above the frequencies of the vibrations which are generated by the engine block during operation, with the result that any vibrations which are transmitted from the engine block onto the exhaust manifold or the exhaust gas catalytic converter experience great damping in the axial direction of the wire cable piece and are thus not transmitted onto the exhaust system in the axial direction of the wire cable piece. At the same time, however, the isolator permits deflections in a plane which is perpendicular with respect to the axial direction of the wire cable piece, with the result that thermal expansions of the exhaust manifold are entirely possible. The ratio of free length to diameter of the wire cable piece or the wire cable pieces is smaller than fifteen, which further reduces the material expenditure of the vibration isolator and makes high vibration damping possible in the axial direction.

The diameter of the wire cable piece can be up to approximately 30 mm, and is, for example, approximately 6 mm.

In one exemplary embodiment of the vibration isolator according to the invention, at least one further wire cable piece is provided. The further wire cable piece is connected to the first mounting plate and the second mounting plate or to the first mounting plate and a third mounting plate, in such a way that it extends rectilinearly between the respective mounting plates. Vibration isolators of this type are advantageous, in particular, when fastening the mounting plate to the exhaust manifold or to the exhaust gas catalytic converter is possible only in a pronounced lateral manner from the center longitudinal axis on account of the conditions. In this case, the vibration damping can be improved further by the further wire cable piece and optionally by the third mounting plate.

In one exemplary embodiment of the wire cable piece or the wire cable pieces according to the invention, the ends are connected in each case fixedly to a sleeve. One sleeve is then connected to the first mounting plate and the other sleeve is connected to the second or to the third mounting plate with a force-transmitting and/or form-fitting connection. This structural variant permits relatively uncomplicated manufacture of the vibration isolator according to the invention. Here, in particular, the sleeve can be pressed onto the respective end of the respective wire cable piece.

As has already been mentioned, a particularly significant use of a vibration isolator of this type consists in being fastened at one end to the engine block of a motor vehicle and at the other end to the exhaust manifold or to an exhaust gas catalytic converter which is connected fixedly to the exhaust manifold. The vibrations which are generated by the engine block during operation in the axial direction of the rectilinear wire cable piece can experience high damping in this way, as a result of which a transmission of the (axial) vibrations in this direction onto following elements, for example onto elements of the exhaust system, can be prevented reliably.

Further advantageous aspects of the invention result from the following description with the aid of the following drawing. The invention, together with further objects and advantages thereof, may best be understood by refernce to the following description in conjunction with the accompanying drawings.

DETAILED DESCRIPTION

Figure 11:
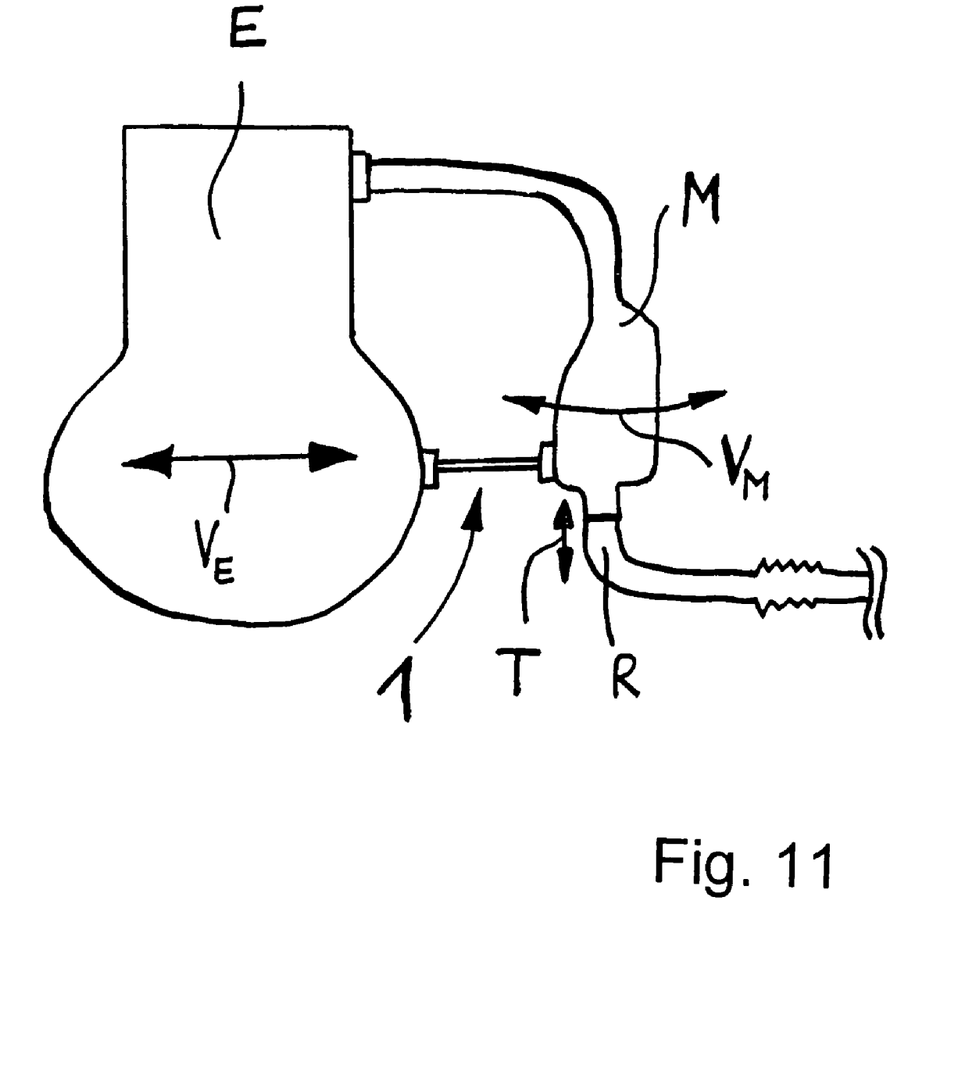
FIG. 11 shows a diagrammatic outline illustration of an engine block with an exhaust manifold and exhaust system.

Reference is first made to the diagrammatic illustration in FIG. 11 for an explanation of the principles. There, the engine block E of a motor vehicle and an exhaust manifold M connected to the latter can be seen (here, an exhaust gas catalytic converter which is connected fixedly to the exhaust manifold M could also be shown). The exhaust system which is indicated here by a pipe R is connected to the outlet of the exhaust manifold M.

During operation, the engine block E vibrates substantially in the direction of the arrows $V_E$. The exhaust manifold M (and optionally the exhaust gas catalytic converter connected to it) can be envisaged as a single-mass oscillator which can oscillate in the direction of the arrows $V_M$. The first resonant frequency of the single-mass oscillator results from the root of the quotient from rigidity and mass of the single-mass oscillator. If the excitation frequency, that is to say the frequency at which the engine block E vibrates during operation, then coincides with this resonant frequency of the single-mass oscillator, there is a case of resonance in which large relative movements between the exhaust manifold M and the engine block E can occur which can lead to damage of the exhaust manifold M.

In order to prevent this, a vibration isolator 1 is fastened at one end to the engine block E and at the other end to the exhaust manifold M. Exemplary embodiments of a vibration isolator of this type will be described in greater detail in the following text. However, it is to be mentioned at this point that the vibration isolator 1 has at least one rectilinear wire cable piece which has a high rigidity in the axial direction, as a result of which the resonant frequency can be pushed out of the main range of the frequencies which are generated by the engine block E during operation, and the case of resonance is thus prevented.

On account of the operating temperatures, thermal expansions of the exhaust manifold M can occur, in particular in the direction of the arrows T. However, the wire cable piece readily permits expansions in one plane perpendicularly with respect to the axial direction, as it has only a relatively low rigidity in these directions. Thermal expansions thus do not lead to high stresses and/or plastic deformations, and thus prevent damage as a result of thermomechanical loading.

Figure 1:
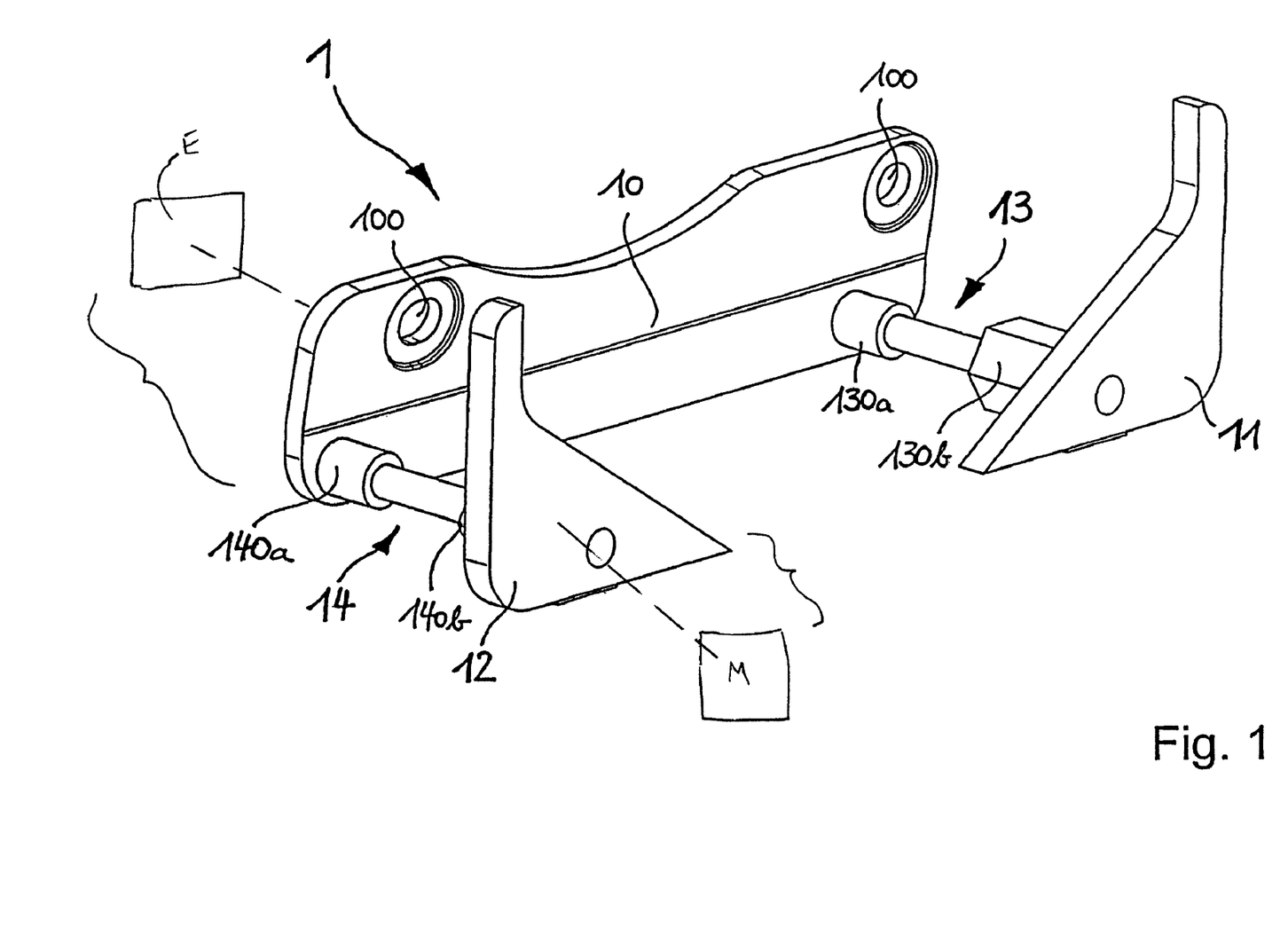
FIG. 1 shows a first exemplary embodiment of a vibration isolator according to the invention, in a perspective illustration.
Figure 2:
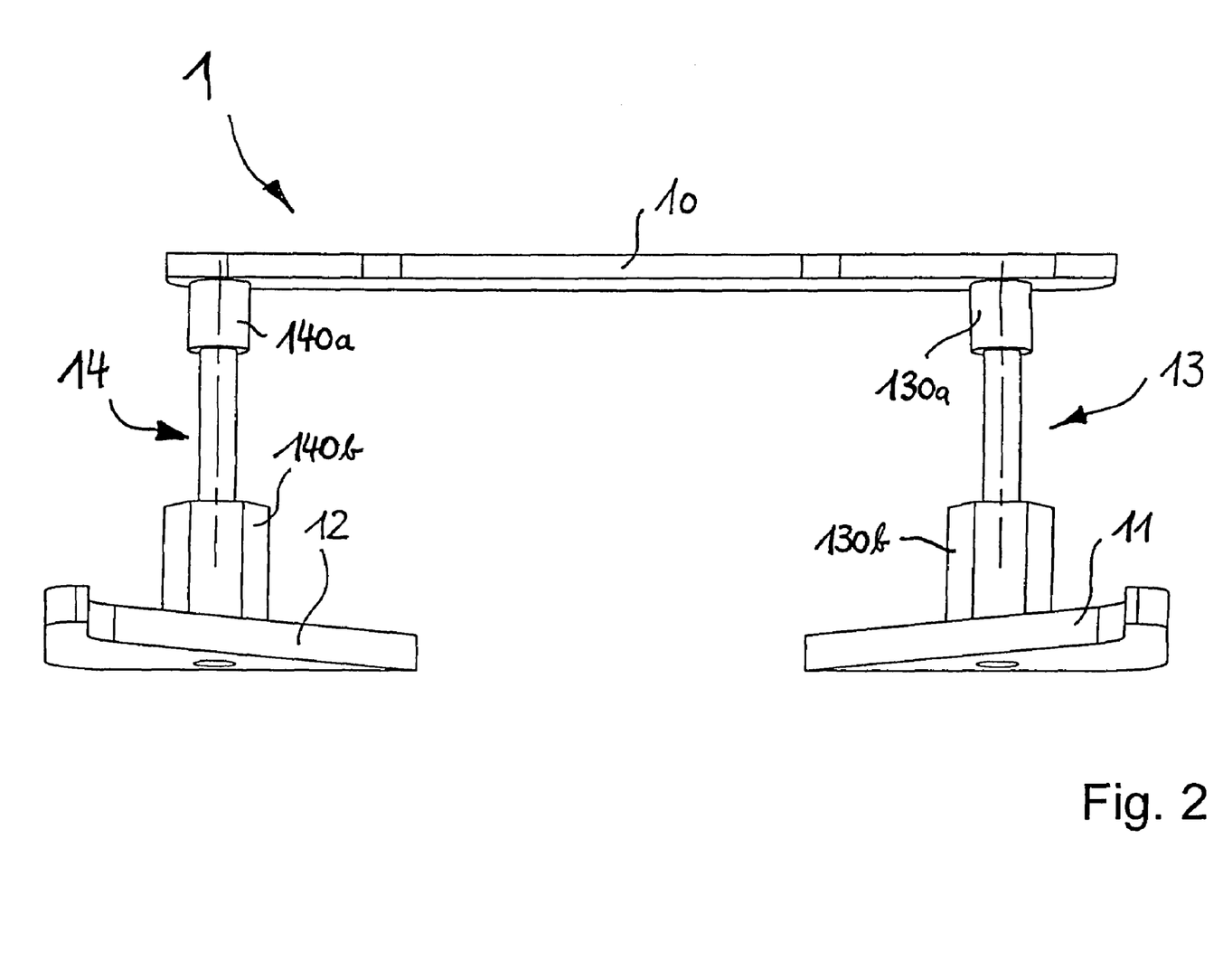
FIG. 2 shows an oblique plan view from above of the first exemplary embodiment of the vibration isolator from FIG. 1.
Figure 3:
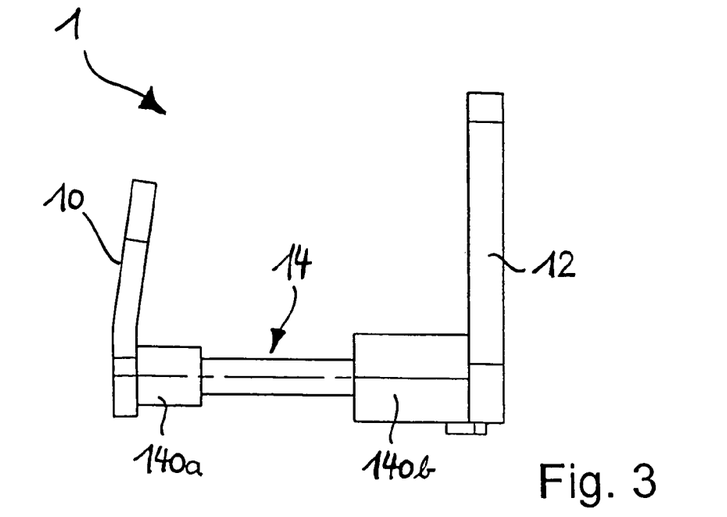
FIG. 3 shows a view from the side of the first exemplary embodiment of the vibration isolator according to the invention from FIG. 1.

FIGS. 1, 2, and 3 show a first exemplary embodiment of the vibration isolator 1 according to the invention. It comprises a first mounting plate 10 for mounting on the engine block of a motor vehicle E, and a second mounting plate 11 and a third mounting plate 12, in each case for mounting to the lower end of the exhaust manifold M or to an exhaust gas catalytic converter of the motor vehicle which follows the exhaust manifold directly and is connected to the latter. The first mounting plate 10 can be fastened to the engine block E, for example, by means of bolts which are screwed through the openings 100 into threaded holes in the engine block. The second and third mounting plates 11 and 12 can also be fastened to the end of the exhaust manifold M or to the exhaust gas catalytic converter with the aid of a screw connection, for which purpose corresponding holes for leading through corresponding bolts can likewise be provided in the second mounting plate 11 and in the third mounting plate 12 (not shown in FIGS. 1 to 3).

The first mounting plate 10 and the second mounting plate 11 are connected to one another by a wire cable piece 13, while the first mounting plate 10 and the third mounting plate 12 are connected to one another by a further wire cable piece 14. The wire cable pieces 13 and 14 extend in each case rectilinearly between the first mounting plate 10 and the second mounting plate 11 or the third mounting plate 12; in the exemplary embodiment shown here, they stand in each case perpendicularly on the respective mounting plate (see FIG. 3).

Sleeves 130a and 130b or 140a and 140b are provided in each case at the two ends of the wire cable pieces 13 and 14, the ends of the wire cable pieces 13 and 14 being connected fixedly in each case to the sleeves. The cylindrical sleeves 130a and 140a can be pressed in each case onto the ends of the wire cable pieces 13 and 14, respectively, in the same way as the hexagonal sleeves 130b and 140b, respectively. The sleeves 130a and 130b or 140a and 140b can for their part be fastened to the respective mounting plates by welding.

In this exemplary embodiment, the second mounting plate 11 and the third mounting plate 12 have a substantially triangular design, but the geometric design of the mounting plates can be adapted in principle to the conditions in the engine compartment.

In the axial direction, the wire cable pieces 13 and 14 have a high rigidity, which leads to the vibration isolator 1 having a high resonant frequency in this axial direction. This means that the vibrations which are generated by the engine in the axial direction during operation experience high damping, because their frequency lies considerably below the resonant frequency of the vibration isolator, but the latter is connected fixedly via the mounting plates 10 or 11 and 12 to the engine block and to the lower end of the exhaust manifold or to the exhaust gas catalytic converter. Vibrations which are generated by the engine in this direction cannot thus be transmitted onto following elements, for example onto elements of the exhaust system.

In contrast, the wire cable pieces are elastic in a plane which is perpendicular with respect to the axial direction of the wire cable pieces 13 and 14. This is particularly advantageous insofar as the exhaust manifold expands during warming in this plane after a cold start. However, the wire cable pieces can follow this thermal expansion without changing their rigidity in the axial direction significantly.

It can be seen in FIG. 3 that the first mounting plate 10 is angled away slightly. This is readily possible and can be predefined, for example, by the shape of the engine block to which the mounting plate 10 is to be fastened. The sleeve 140a or the wire cable piece 14 stand perpendicularly, however, on the mounting plate 10 at those locations at which the sleeve 140a (the remaining sleeves cannot be seen in FIG. 3) is fastened to the mounting plate 10.

Figure 4:
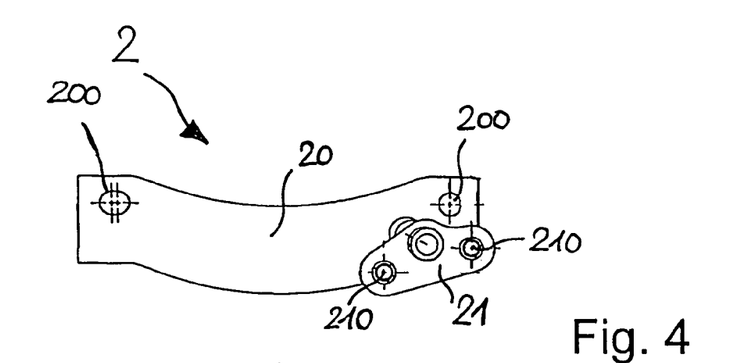
FIG. 4 shows a view from the front of a second exemplary embodiment of a vibration isolator according to the invention.
Figure 5:
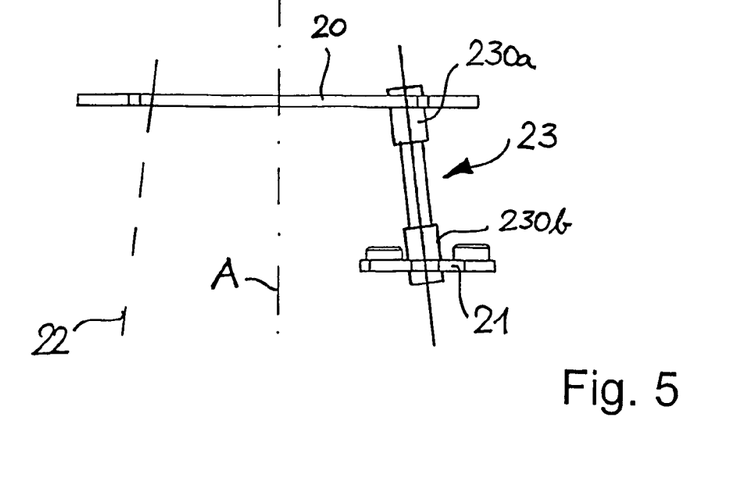
FIG. 5 shows a plan view of the second exemplary embodiment of the vibration isolator from FIG. 4.

A second exemplary embodiment of the vibration isolator 2 according to the invention can be seen in FIGS. 4 and 5. This exemplary embodiment again comprises a first mounting plate 20 for fastening to the engine block, and a second mounting plate 21 and a third mounting plate (not shown). The first mounting plate 20 and the second mounting plate 21 are connected to one another by a wire cable piece 23 which extends rectilinearly between the two mounting plates 20 and 21. In each case one cylindrical sleeve 230a or 230b is pressed onto the ends of the wire cable piece 23, and these sleeves 230a and 230b are for their part fastened, for example welded, to the respective mounting plate 20 and 21, respectively.

As can be seen in FIG. 5, although the wire cable piece extends rectilinearly between the first mounting plate 20 and the second mounting plate 21, it does not stand perpendicularly on these two mounting plates. However, a third mounting plate and a further wire cable piece (indicated by the dashed line 22) are arranged symmetrically to the axis A, with the result that vibrations in the direction of the longitudinal axis (parallel to the axis A) once again experience very high damping, similarly as is also the case in the exemplary embodiment according to FIG. 1 to FIG. 3.

The first mounting plate 20 and the second mounting plate 21 (and also the mounting plate indicated by the dashed line 22) can again be connected by screw connections to the engine block and the lower end of the exhaust manifold, for which purpose corresponding holes 200 can be provided in the first mounting plate and corresponding holes 210 can be provided in the second mounting plate 21 (and corresponding holes can likewise be provided in the third mounting plate (in a manner which is not shown)).

Figure 6:
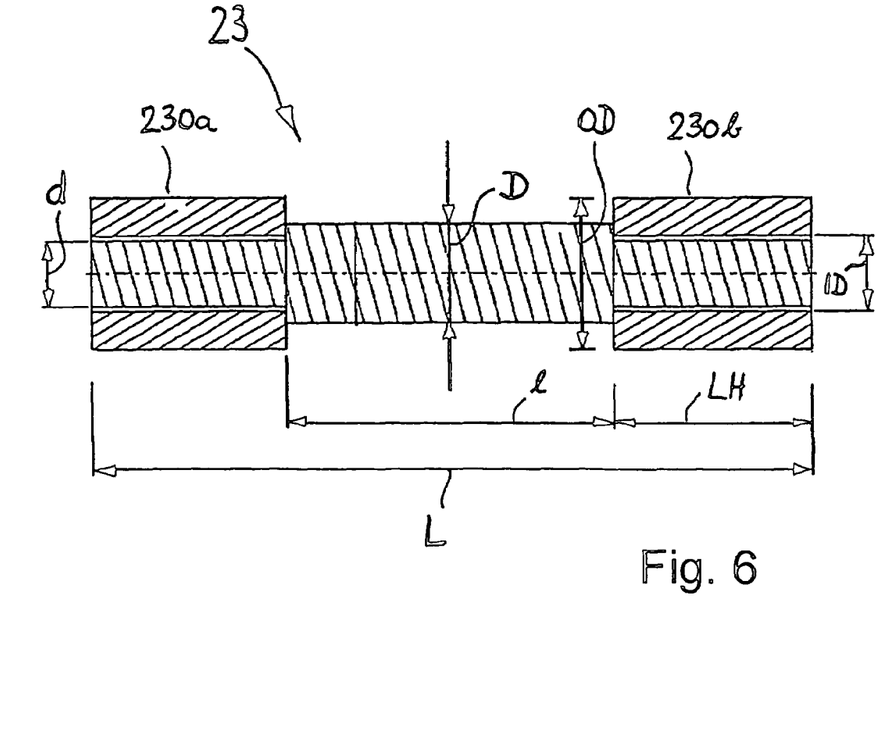
FIG. 6 shows a longitudinal section through a wire cable piece of the vibration isolator according to the invention, with sleeves at both ends.

FIG. 6 shows a sectional illustration of an exemplary embodiment of the wire cable piece 23 of the vibration isolator according to the invention. Cylindrical sleeves 230a and 230b are pressed onto the two ends of the wire cable piece 23, a small annular gap additionally being indicated in FIG. 6 around the ends of the wire cable piece 23, in order to make it clear that the sleeves 230a and 230b can be pressed on here (manufacture). The exemplary embodiment shown here of the wire cable piece 23 (including the sleeves 230a and 230b) has an overall length L which is, for example, 44 mm here. The free length l of the wire cable piece 23 is 20 mm here, while the diameter D of the wire cable piece 23 is approximately 6 mm in the region of its free length l. The diameter d of the free ends of the wire cable piece is 4 mm, while the inner diameter ID of the cylindrical sleeves 230a and 230b is approximately 4.6 mm before they are pressed on, with the result that the ends of the wire cable piece 23 can be inserted easily into the sleeves 230a and 230b. The length LH of the sleeve 230a and 230b is, for example, 12 mm here, and the outer diameter of the sleeves OD is, for example, 9.2 mm here.

In general, the ratio of the free length l of the wire cable piece 23 to the diameter D in the region of the free length l of the wire cable piece 23 is smaller than fifteen; in particular, the diameter of the wire cable piece 23 can be up to approximately 30 mm.

For the manufacture of the wire cable piece, wires of a very wide range of diameters, material and wire cross section can be woven or twisted with one another in a variety of ways to form a wire cable piece. A protective cover can be provided (not shown) around the wire cable piece, to protect against external attacks (for example, corrosion). The individual wires can also be coated.

Figure 7:
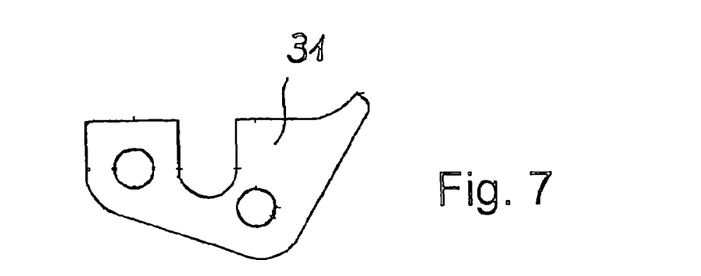
FIG. 7 shows an exemplary embodiment of a mounting plate for fastening to an exhaust gas catalytic converter, in a third exemplary embodiment of the vibration isolator according to the invention.
Figure 8:
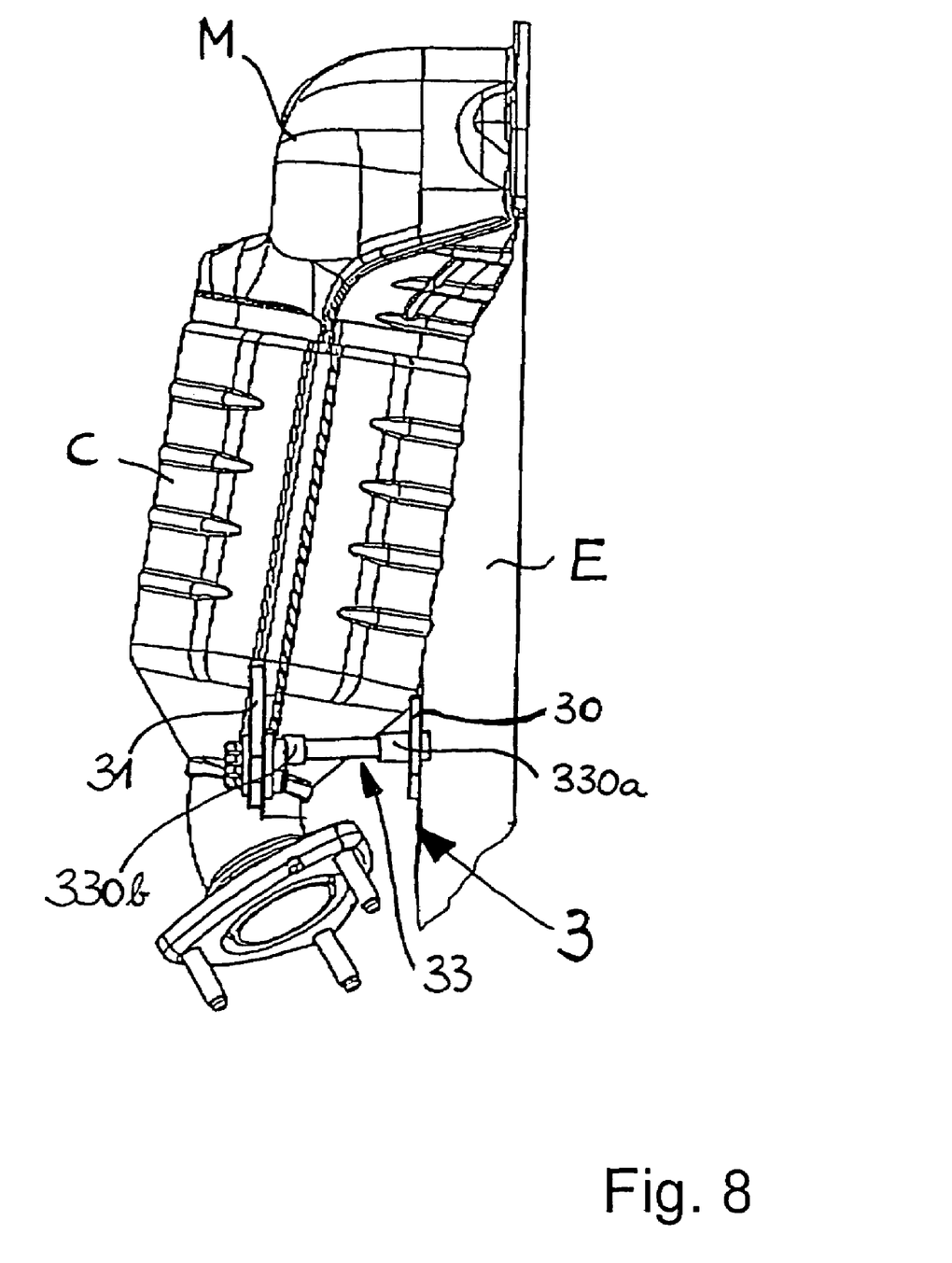
FIG. 8 shows an exhaust manifold with an adjoining exhaust gas catalytic converter and a vibration isolator according to the invention having a mounting plate according to FIG. 7, in a side view.
Figure 9:
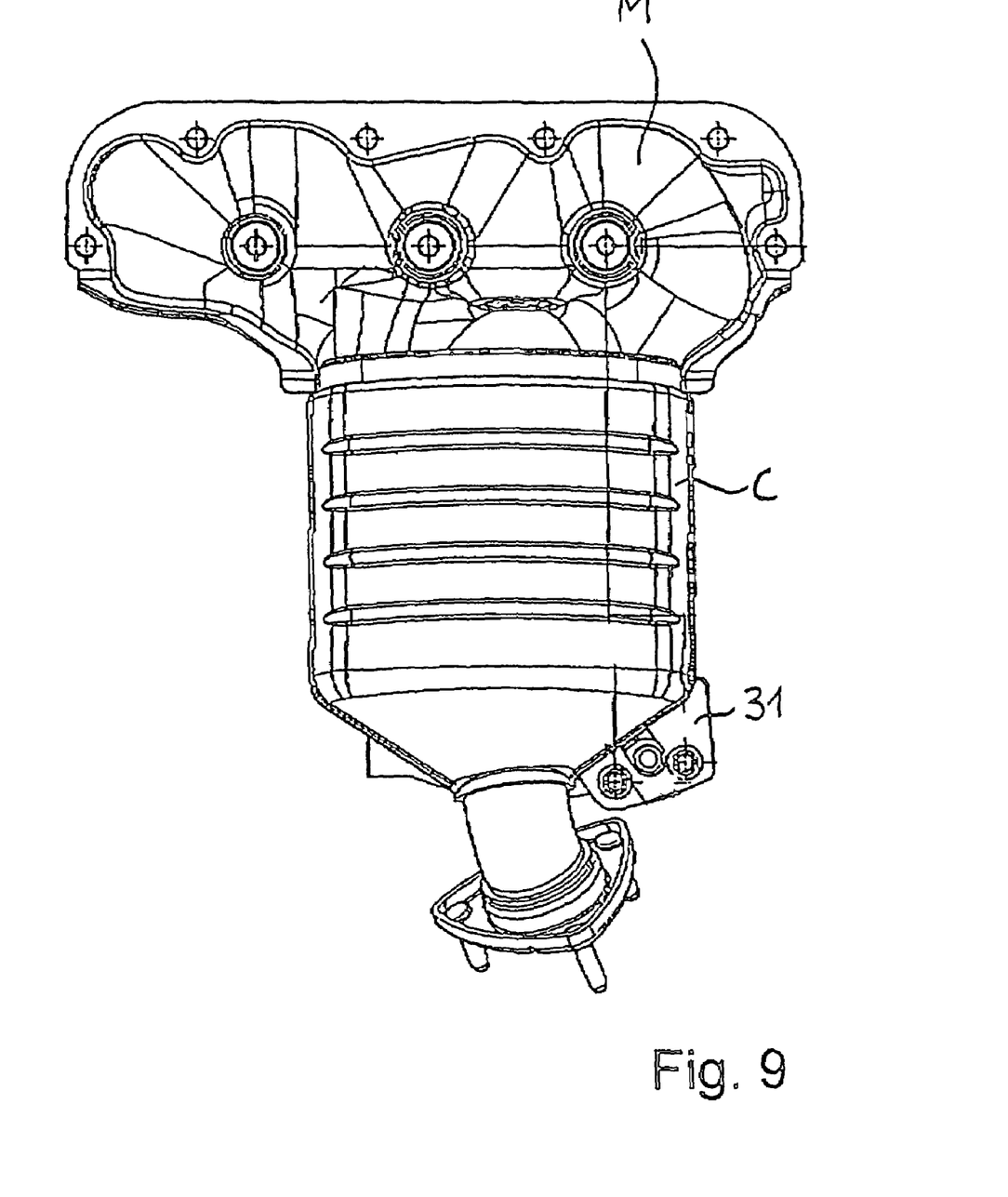
FIG. 9 shows a front view of the exhaust manifold and exhaust gas catalytic converter from FIG. 8, with the vibration isolator according to the invention.

A further exemplary embodiment of a mounting plate 31 of a third exemplary embodiment of the vibration isolator according to the invention can be seen in FIG. 7. The mounting plate 31 is designed to be fastened to the lower end of the exhaust manifold M, or to an exhaust gas catalytic converter C which immediately adjoins the exhaust manifold M, as shown in FIGS. 8 and 9. The other mounting plate 30 can be provided on the engine block E, and the wire cable piece 33 extends rectilinearly between the two mounting plates 30 and 31. As has been previously explained, the two mounting plates are connected to one another with the aid of the wire cable piece 33, cylindrical sleeves 330a and 330b being pressed onto the ends of the wire cable piece 33, it being possible for said cylindrical sleeves 330a and 330b to be welded for their part to the respective mounting plate. As can be seen in FIG. 9, the mounting plates can be fastened by screw connections to the exhaust gas catalytic converter C or to the engine block E. Although not shown in FIGS. 8 and 9, a further mounting plate can be provided on the other side (to the left of the exhaust gas catalytic converter C in FIG. 9), which further mounting plate is fastened to the exhaust gas catalytic converter and is connected to the mounting plate 30 (see FIG. 8) via a further wire cable piece (likewise not shown here).

Figure 10:
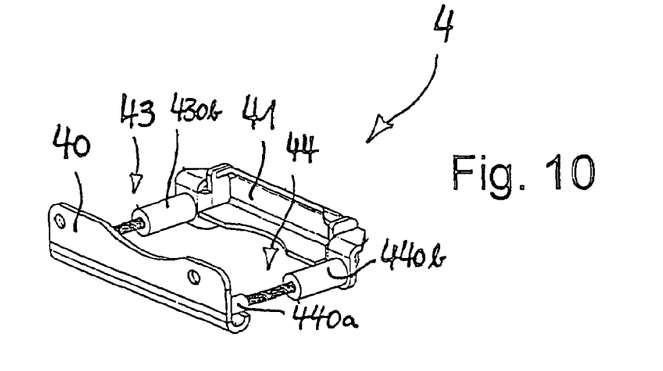
FIG. 10 shows a further exemplary embodiment of a vibration isolator according to the invention.

Finally, a fourth exemplary embodiment of the vibration isolator 4 according to the invention can be seen in FIG. 10. Said exemplary embodiment comprises a first mounting plate 40 for mounting on the engine block, and a second mounting plate 41 for fastening to the exhaust manifold or to an immediately following exhaust gas catalytic converter which is connected to the exhaust manifold. The two mounting plates 40 and 41 are connected to one another with the aid of wire cable pieces 43 and 44, onto the ends of which in each case sleeves 430a (not shown) and 430b and 440a and 440b are pressed. For their part, the sleeves can be connected to the respective mounting plates by welding.

In principle, the shape of the mounting plates can be adapted to the conditions in the engine compartment. The length of the wire cable pieces can likewise be adapted within the specified limits to the conditions in the engine compartment. Although they always extend rectilinearly between the mounting plates, they do not necessarily have to stand perpendicularly on the mounting plates (see, for example, exemplary embodiment according to FIG. 5).

Moreover, it is to be mentioned that, although the portrayed application for the vibration isolator according to the invention between the engine block and the lower end of the exhaust manifold is in principle a very important application, it is also feasible for a vibration isolator of this type to have other fields of application; in particular, it is feasible, for example, to fasten an element of the exhaust system, for example a muffler, to the underbody or to the frame of a motor vehicle with the aid of the vibration isolator according to the invention.

What is claimed is:

1. Method of using a vibration isolator having a first mounting plate and having a second mounting plate, and having at least one wire cable piece which is connected both to the first mounting plate and to the second mounting plate, the wire cable piece being connected to the two mounting plates in such a way that it extends rectilinearly between the two mounting plates and having a high rigidity in the axial direction as a result of which the resonant frequency is pushed out of the main range of frequencies generated by an engine block of a motor vehicle during operation and further having a low rigidity in the direction of a plane perpendicularly with respect to the axial direction to permit expansions in this plane, the method comprising the step of fastening the first mounting plate of the vibration isolator directly to the engine block and the second mounting plate of the vibration isolator directly to an exhaust manifold which is connected to the engine block, or fastening the first mounting plate of the vibration isolator directly to the engine block and the second mounting plate directly to an exhaust gas catalytic converter which is connected fixedly to the exhaust manifold.

2. The method of claim 1, comprising the step of using a vibration isolator in which at least one further wire cable piece is provided which is connected to the first mounting plate and to the second mounting plate or which is connected to the first mounting plate and a third mounting plate, in such a way that it extends rectilinearly between the respective mounting plates.

3. The method of claim 1, comprising the step of using a vibration isolator in which, at the two ends of the at least one wire cable piece a sleeve is connected fixedly to the end of the at least one wire cable piece, one sleeve being connected to the first mounting plate and the other sleeve being connected to the second or to the third mounting plate with a force-transmitting and/or form-fitting connection.

4. The method of claim 3, comprising the step of using a vibration isolator in which the sleeve is pressed onto the respective end of the respective wire cable piece.

5. The method according to claim 1, comprising the step of using a vibration isolator in which the ratio of free length to diameter of the at least one wire cable piece is smaller than fifteen.

6. The method of claim 5, comprising the step of using a vibration isolator in which the diameter of the at least one wire cable piece is up to approximately 30 mm.

7. The method of claim 5, comprising the step of using a vibration isolator in which the diameter of the at least one wire cable piece is approximately 6 mm.

* * * * *